United States Patent Office 3,580,912
Patented May 25, 1971

3,580,912
BIOLOGICALLY ACTIVE SUBSTITUTED-
S-TRIAZINES
Werner Heimberger and Hermann Schmitt, Hanau am
Main, Germany, assignors to Deutsche Gold- und
Silber-Scheideanstalt vormals Roessler, Frankfurt am
Main, Germany
No Drawing. Filed Nov. 30, 1967, Ser. No. 686,790
Claims priority, application Germany, Dec. 3, 1966,
D 51,705
Int. Cl. C07d 55/22
U.S. Cl. 260—247.5R          5 Claims

ABSTRACT OF THE DISCLOSURE

Substituted-s-triazines having anti-inflammatory action of the formula

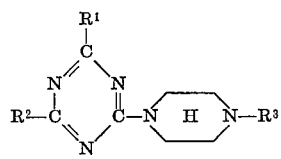

in which $R^1$ is —NRAlky,

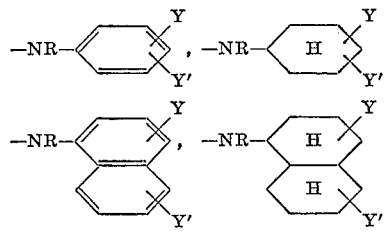

wherein
alkyl is alkyl or alkyl substituted with CN or cl;
R has the same significance as alkyl but in addition can be hydrogen;
each of Y and Y′ are hydrogen, halogen, $NO_2$, —alkyl, —Oalkyl, OH or COOH;
$R^2$ is

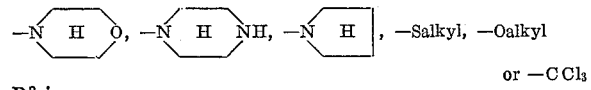, —Salkyl, —Oalkyl or —$CCl_3$ $R^3$ is

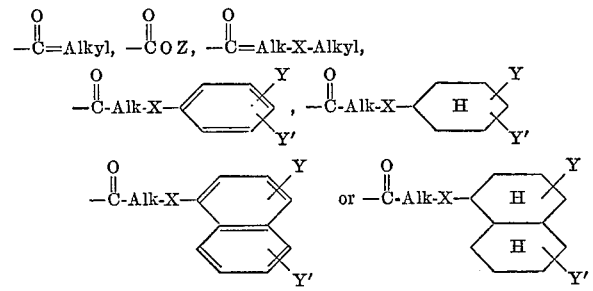

in which X is O or S, Z is alkyl, phenyl, naphthyl or cyclohexyl, Alk is alkylene and the alkyl and alkylene included in R, $R^1$ to $R^3$ and Z having up to 6 carbon atoms and their pharmocologically acceptable acid addition salts.

RELATED APPLICATION

This application is related to co-pending application entitled "Novel Biologically Active Substituted-S-Triazines, filed Nov. 24, 1967, Ser. No. 685,258.

BACKGROUND OF THE INVENTION

Substituted-S-triazine of the formula

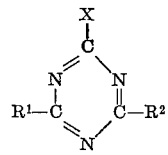

are known wherein X is —$CCl_3$, —$CHCl_2$, $CH_2Cl$; $R^1$ is piperazino, piperidino and preferably morpholino and $R^2$ has the same significance as $R^1$ and in addition can be

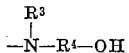

in which $R^3$ is lower alkyl of 1 to 6 carbon atoms or preferably hydrogen and $R^4$ a lower alkyl of 1 to 6 carbon atoms. They are marked, for example, by their analgesic activity (Belgian Pat. 678,190).

DESCRIPTION OF THE INVENTION INCLUDING PREFERRED EMBODIMENTS

The present invention concerns novel compounds of the Formula I described above, as well as their pharmacologically acceptable acid addition salts.

These compounds can be prepared by:

(a) First reacting a tris-halogen-S-triazine, preferably, cyanuric chloride, with one compound of the Formulae $HR^2$ (II) and $HR^1$ (III) and then with the other, preferably without intermediate isolation to produce a compound of the formula

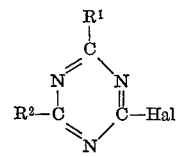
                                                    IV wherein Hal stands for halogen and reacting such compound with piperazine to produce a compound of the formula

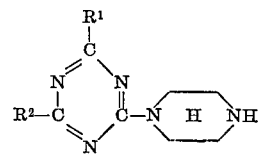
                                                    V and then reacting the compound of the Formula V either with an alkyl-, phenyl-, naphthyl- or cyclohexyl ester of chloroformic acid or with phosgene and an alcohol or with a carboxylic acid halide to produce a compound of the Formula I or then reacting the compound of the Formula V with a halogen carboxylic acid halide to produce a compound of the formula

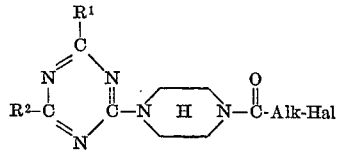
                                                    Va and this compound is further treated with a compound of the formula:

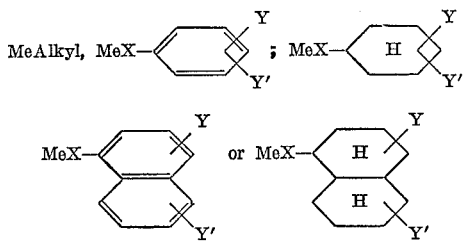

wherein X is alkali metal or H or also by reacting the compound of the Formula V with a compound of the formula:

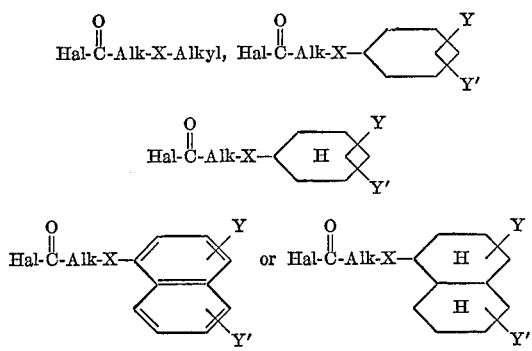

or (b) First reacting a tris-halogen-S-triazine preferably, cyanuric chloride, with one of the compounds of the Formulae II and III and then with the other to produce a compound of the Formula IV and then reacting this compound with a compound of the formula

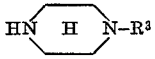      VI (c) Reacting a compound of formula

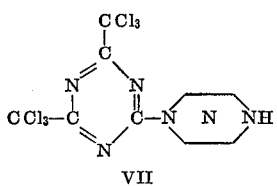

VII

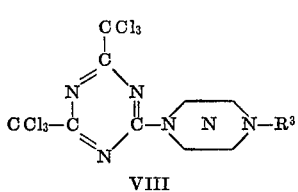

VIII

In the production of the compounds according to the invention it, for example, can be expedient to dissolve the cyanuric chloride in an alcohol, preferably, methanol, or suspend such cyanuric chloride in a mixture of water and an alcohol or acetone and then adding an equimolecular quantity of one of the amines and neutralizing the acid set free, for instance, by addition of an alkali metal hydroxide and thereafter, preferably without isolation of the intermediate products, adding the equimolecular quantity of the other amine and again neutralizing the acid set free. The compound thus formed is isolated and then heated under reflux in an alcohol, preferably, methanol, in the presence of at least equimolecular quantities of piperazine or a piperazine derivative of the Formula VI. The acid set free can be neutralized by the presence of an excess of the piperazine compound or by addition of alkali metal hydroxide. The compound is then isolated and if piperazine was employed it can then be dissolved, for instance, in ethyl acetate and equimolecular quantities of a halogen formic acid alkyl ester added to such solution. The neutralization of the acid set free can be effected with alkali metal hydroxide. Analogously it is also possible to use phosgene and alcohol in place of the halogen formic acid alkyl ester.

All acids normally employed in the production of medicament salts can be used for the production of salts of the compounds according to the invention, such as, HCl, HBr, $H_2SO_4$, $H_3PO_4$, sulfamic acid, benzyl sulfonic acid, p-toluene sulfonic acid, maleic acid, fumaric acid, succinic acid, malonic acid, lactic acid, tartaric acid, citric acid, ascorbic acid, glycolic acid, salicylic acid, acetic acid and the like.

The compounds according to the invention have a good anti-inflammatory action.

The anti-inflammatory action is, for example, shown on the inflammation models of the rat paw (method of Domenjoz and Coll., Arch. exp. Pharm. Pathol. 230, 325, 1957). The compounds according to the invention, for example, have strong anti-inflammatory action on carrageen edema of the rat paw at oral dosages of 1–300 mg./kg. The best of such compounds at an oral dosage of 30 mg./kg. caused an 80 to over 90% reduction in the carrageen edema whereas phenyl butazone at the same dosage only effected a 50% reduction.

The acute toxicity of the compounds according to the invention, namely, the LD 50 in mg./kg. on mice, using the method of Miller and Tainter (Proc. Soc. exper. Biol. a. Med. 57, 261, 1944) is between 200 and 10,000 mg./kg., oral. The best compounds according to the invention are about 3 to 20 times less toxic than phenyl butazone and therefore can be considered well tolerated.

Indications as anti-inflammatory medicaments:

Chronic polyarthritis
Rheumatic diseases
Posttraumatic inflammations
Swellings resulting from fractures
Thrombophlebitis of all forms, including postoperative
Bursitis
Synovitis
Collagenoses (polymyositis, periarteriitis)
Gout
Intraperitoneal adhesions The application of the compounds according to the invention can be enteral or parenteral in the form of tablets, capsules, pills, dragées, suppositories, oils and aqueous solutions or suspensions and emulsions.

The individual dose, depending upon the mode of application, can be between 0.1 and 500 mg. and can be administered 1 or more times a day.

The following examples will serve to illustrate the compounds according to the invention.

EXAMPLE 1

(a) 24 g. (0.1 mol) of 2-ethyl amino-4-morpholino-6-chloro-S-triazine were suspended in 100 ml. of ethanol and 25.8 g. of piperazine (0.3 mol) added thereto and the mixture heated under reflux for 30 minutes whereupon solution resulted. After the ethanol was distilled off the residue was taken up in methylene chloride and washed several times with water. After the methylene chloride was distilled off the syrupy residue was stirred up with ether whereupon the 2-ethyl amino-4-morpholino-6-piperazino-S-triazine crystallized out. The yield was 22.5 g., that is, 77% of theory. Its melting point was 110–112° C.

(b) 29.3 g. (0.1 mol) of the product as obtained under (a) were dissolved in 150 ml. of methylene chloride and 10.1 g. of triethyl amine (0.1 mol) added thereto. Thereafter a solution of 12.3 g. of chloroformic acid isopropyl ether in 50 ml. of methylene chloride was added dropwise while stirring, the temperature being maintained at 20° C. After the reaction mixture stood overnight, the triethyl-ammonium salt was washed out with water and the solution dried and the solvent distilled off. 35 g. of 2-ethyl amino-4-morpholino-6-N'-carboisopropoxy - piperazino-S-triazine (92.4% of theory) were obtained. After recrystallization from alcohol the pure product

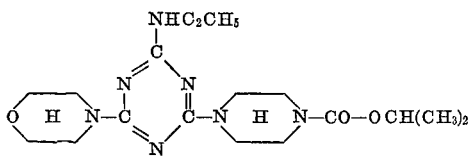

with a melting point of 149–150° C. was obtained.

EXAMPLE 2

(a) 29.3 g. (0.1 mol) of 2-ethyl amino-4-morpholino-6-piperazino-S-triazine were dissolved in 100 ml. of methylene chloride and 10.6 g. (0.105 mol) of triethyl amine added thereto. While stirring, a solution of 9.9 g. of chloroformic acid methyl ester (0.105 mol) in 50 ml. of methylene chloride was added dropwise, the temperature being maintained at 20° C. After the reaction mixture was processed as in Example 1(b), 29 g. of 2-ethyl amino-4-morpholino-6-N'-carbomethoxy-piperazino - S - triazine of a melting point of 118–120° C. were obtained. The yield therefore was 82.6% of theory.

(b) The procedure under (a) was repeated using 11.4 g. of chloroformic acid ethyl ester (0.105 mol) instead of the chloroformic acid methyl ester. 32 g. of 2-ethyl amino - 4 - morpholino-6-N'-carboethoxy-piperazino-S-triazine of a melting point of 119–122° C. were obtained. The yield therefore was 87.6% of theory.

EXAMPLE 3

(a) 29.3 g. (0.1 mol) of 2-ethyl amino-4-morpholino-6-piperazino-S-triazine were dissolved in 100 ml. of methylene chloride and then simultaneously 40 ml. of a solution of 10.1 g. (0.1 mol) of triethyl amine in methylene chloride and 40 ml. of a solution of 11.3 g. of chloroacetyl chloride in methylene chloride added dropwise during a period of 45 minutes. After processing as in Example 1(b), the crude product obtained was stirred up with ether whereby the impurities were dissolved out. 29.4 g. of 2-ethyl amino-4-morpholino-6-N'-chloroacetyl-piperazino-S-triazine (97%) of a melting point of 152–156° C. were obtained. The yield was 79.6% of theory.

(b) 36.9 g. (0.1 mol) of the product thus produced were introduced into a solution of 2.7 g. of sodium (0.113 mol) and 10.6 g. of phenol (0.113 mol) in 200 ml. of ethanol and the mixture heated under reflux while stirring for 90 minutes whereupon the reacted triazine compound dissolved in NaCl precipitated out. Upon cooling the product crystallized out. 36 g. of 2-ethyl amino-4-morpholino-6-N'-phenoxyacetyl-piperazino-S-triazine

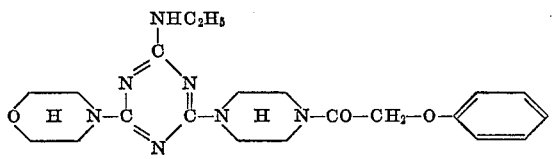

of a melting point of 150–155° C. (97%) were obtained. The yield was 84.3% of theory.

EXAMPLE 4

(a) 46.1 g. of cyanuric chloride (0.25 mol) were dissolved in 500 ml. of methylene chloride and then 53.6 g. of m-toluidine (0.5 mol) added dropwise to such solution over a period of 30 minutes while stirring, the temperature being maintained between 0° and −5° C. The toluidine hydrochloride which precipitated out was filtered off and then 43.6 g. (0.5 mol) of morpholine added dropwise to the filtered solution over a period of 30 minutes. The morpholine hydrochloride which precipitated out was filtered off and the solvent distilled off. The residue washed with water and dried. 73.5 g. of 2-(3-methyl)-anilino-4-morpholino-6-chloro-S-triazine with a melting point of 144–146° C. were obtained. The yield therefore was 96.6% of theory.

(b) 30.6 g. (0.1 mol) of the product thus obtained were added portionwise while stirring to a boiling solution of 58.2 g. of piperazine hexahydrate (3× 0.1 mol) in 300 ml. of ethanol over a period of 60 minutes and the mixture heated for a further 30 minutes. After cooling the by-products (dimers) crystallized out from the solution and were filtered off. After the ethanol had been distilled off 29.4 g. of 2-(3-methyl)-anilino-4-morpholino-6-piperazino-S-triazine of a melting point of 109–114° C. were obtained. The yield was 82.8% of theory.

(c) 35.5 g. (0.1 mol) of the thus obtained product were dissolved in 100 ml. of methylene chloride and 10.6 g. (0.105 mol) of triethyl amine added thereto. Then 9.9 g. of chloroformic acid methyl ester (0.105 mol) were added dropwise over a period of 30 minutes, the temperature being maintained at 20° C. After processing as in Example 1(b), 29.3 g. of 2-(3-methyl)-anilino-4-morpholino-6-N'-carbomethoxy-piperazino-S-triazine of a melting point of 148–152° C. were obtained. The yield was 71% of theory.

EXAMPLE 5

(a) 46.1 g. of cyanuric chloride were reacted with 53.6 g. of o-toluidine and 43.6 g. of morpholine as described in Example 4(a). After processing, 71 g. of 2-(2-methyl)-anilino-4-morpholino-6-chloro-S-triazine of a melting point of 146–150° C. were obtained. The yield was 93.3% of theory.

(b) 30.6 g. of the triazine compound produced were reacted with 58.2 g. of piperazine hexahydrate as described in Example 4(b). After processing 28 g. of 2-(2-methyl)-anilino-4-morpholino-6-piperazino-S-triazine of a melting point of 129–131° C. were obtained. The yield was 78.8% of theory.

(c) 35.5 g. of the triazine thus obtained were reacted as described in Example 4(c) with 10.1 g. (0.11 mol) of chloroformic acid methyl ester and 11.1 g. (0.11 mol) of triethyl amine. After processing 36 g. of 2-(2-methyl)-anilino - 4 - morpholino-6-N'-carbomethoxy-piperazino-S-triazine with a melting point of 120–123° C. were obtained. The yield was 87% of theory.

We claim:

1. A compound selected from the group consisting of [A] a triazine compound of the formula

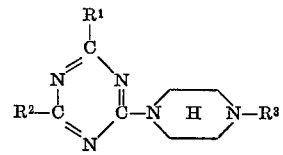

in which $R^1$ is $—NHC_2H_5$, $R^2$ is

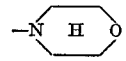

and $R^3$ is selected from the group consisting of

[a]   

and

[b]   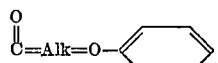

Z being alkyl and Alk being alkylene and alkyl and alkylene having up to 6 carbon atoms, and [B] their pharmacologically acceptable acid addition salts.

2. The compound according to claim 1, 2-ethyl amino-4-morpholino-6-N'-carboisoproxy-piperazino-S-triazine.

3. The compound according to claim 1, 2-ethyl amino-4-morpholino-6-N'-carboethoxy-piperazino-S-triazine.

4. The compound according to claim 1, 2-ethyl amino-4-morpholino-6-N'-carbomethoxy-piperazino-S-triazine.

5. The compound according to claim 1, 2-ethyl amino-4-morpholino-6-N'-phenoxy acetyl-piperazino-S-triazine.

References Cited

UNITED STATES PATENTS 3,178,423  4/1965  Staehelin et al. ---- 260—249.6X
3,310,557  3/1967  Kleemann -------- 260—249.6

JOHN M. FORD, Primary Examiner

U.S. Cl. X.R.

260—247.2B, 249.6, 249.9, 249.8; 424—248, 249